Jan. 6, 1970     W. P. DUGAN ETAL     3,487,539
METHOD OF MANUFACTURING FLANGED WAVEGUIDES
Filed Sept. 29, 1964     2 Sheets-Sheet 1
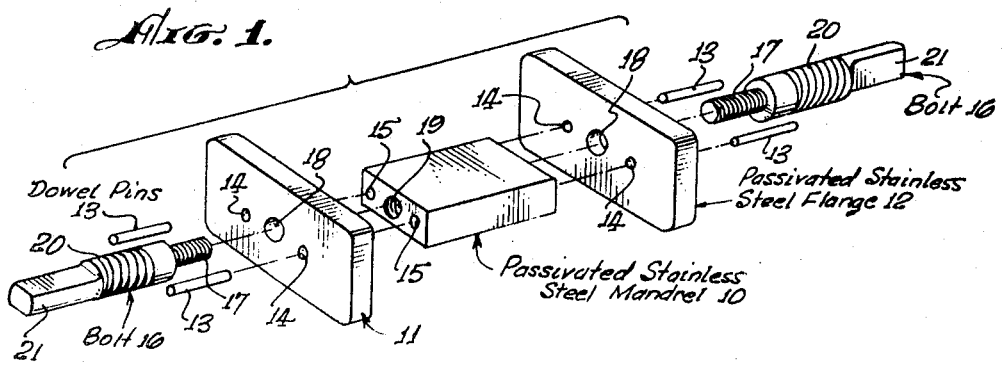
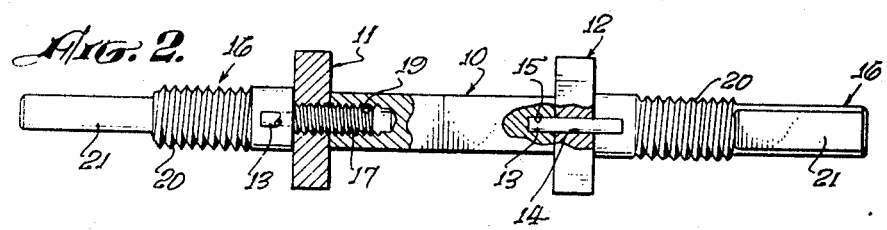
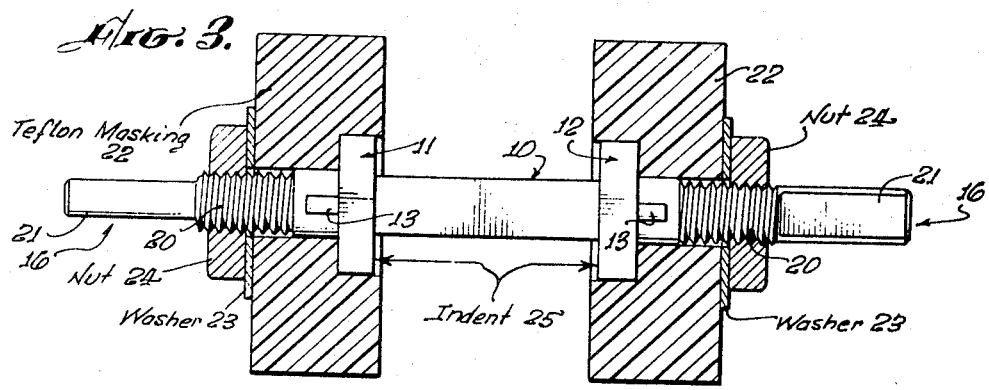
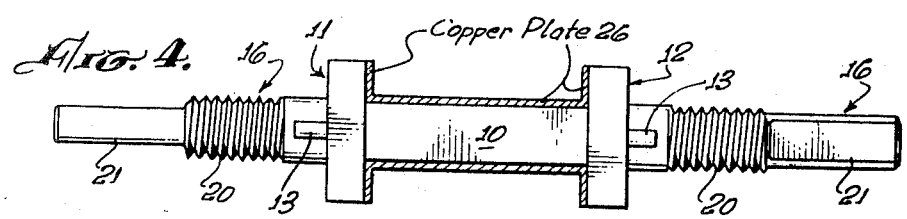
INVENTORS.
WILLIAM P. DUGAN,
WILLIAM L. MacTURK,
By *John T. Haywood*
ATTORNEY.

Jan. 6, 1970   W. P. DUGAN ETAL   3,487,539
METHOD OF MANUFACTURING FLANGED WAVEGUIDES
Filed Sept. 29, 1964                                       2 Sheets-Sheet 2
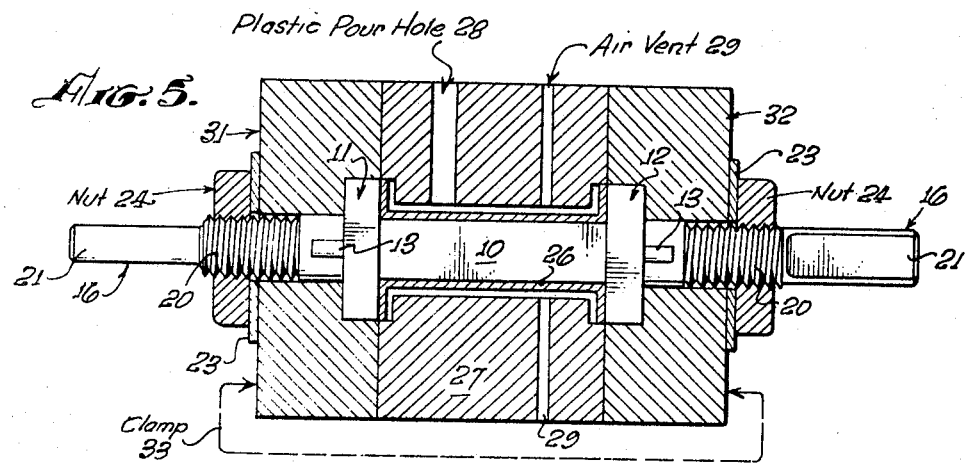
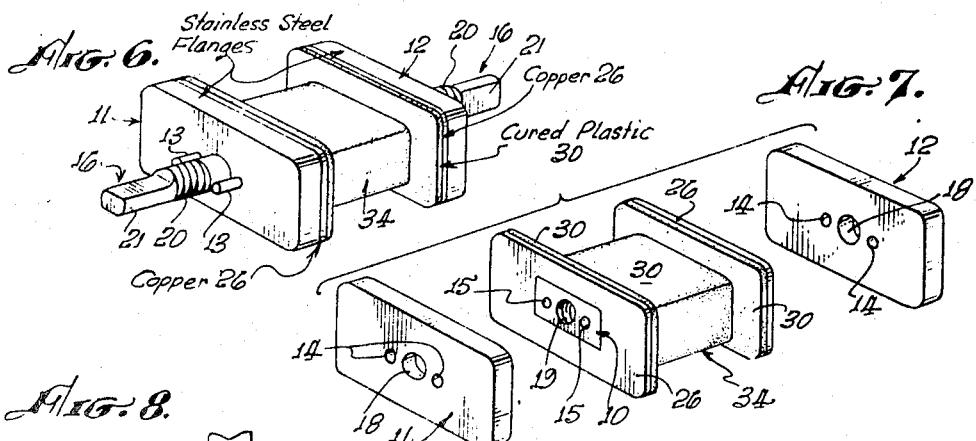
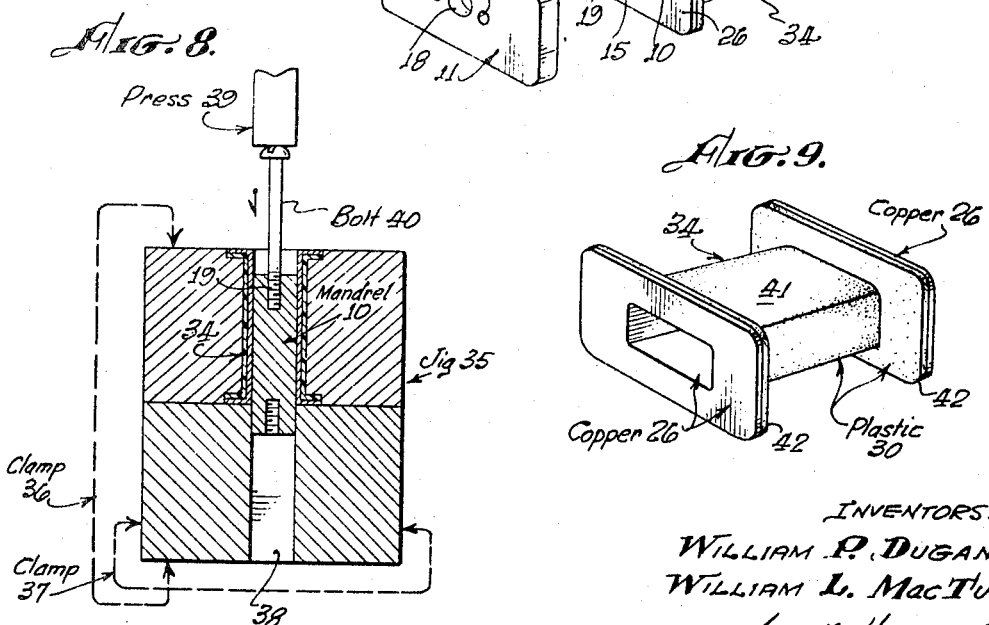
INVENTORS.
WILLIAM P. DUGAN,
WILLIAM L. MacTURK,
By
ATTORNEY United States Patent Office 3,487,539
Patented Jan. 6, 1970

3,487,539
METHOD OF MANUFACTURING FLANGED WAVEGUIDES
William P. Dugan, Monterey Park, and William L. MacTurk, Claremont, Calif., assignors to General Dynamics Corporation, Pomona, Calif., a corporation of California
Filed Sept. 29, 1964, Ser. No. 399,977
Int. Cl. H01p *11/00*
U.S. Cl. 29—600                                                 6 Claims

ABSTRACT OF THE DISCLOSURE

Broadly, the disclosure relates to a fabrication method for flanged waveguides and the end item thereof consisting of a light weight plastic body and a single continuous metallic portion. The method essentially comprises the steps as follows: copper plate a passivated stainless steel mandrel and two stainless steel flanges so as to form the single continuous waveguide portion; enclose the entire unit in an appropriate Teflon mold; inject into the mold and subsequently cure a suitable plastic compound; and, finally, remove the mold and the passivated stainless steel mandrel and flange elements.

---

This invention relates to waveguides and their method of manufacture, and particularly to flanged waveguides and their method of manufacture wherein surface continuity is provided across the body and the flange junction.

The use of metal waveguides in the electronic industry for the reception and transmission of high frequency energy is enormous. Most all high frequency apparatus require a waveguide system. This can be a problem in missile manufacture where metal waveguides must be held to a minimum because of bulk, weight, and electrical considerations.

In missile antenna systems where weight because of torque and seeker requirements becomes a major problem, metal waveguides must be eliminated if possible. Out of this problem has evolved the light weight plastic waveguide with a layer of suitable metal deposited thereon.

In the prior art teaching, it has been found desirable to produce the waveguide section of a waveguide component by electrolytic deposition of a suitable metal upon a mandrel which is later removed from the metal shell produced. However, difficulty is often experienced in providing a means of coupling the waveguide section thus produced to other equipment.

Prior attempts to produce the light weight plastic waveguides as illustrated, for example, by the U.S. Patent No. 2,870,524 issued to J. A. C. Kinnear,, have not been fully satisfactory because of the surface discontinuity between the waveguide section and the supporting flange or flanges.

The structure of this invention consists of a light weight plastic body with flanges as an integral part of the waveguide body. The unique property of this invention is that the copper plating in the inside of the body of the waveguide extends across the flange junction to the outer edge of the flange with no surface discontinuity present. This results in less electrical disturbance than in metal of prior art plastic backed waveguides where flange alignment to body and surface continuity at the junction cause a larger VSWR.

Therefore, it is an object of this invention to provide a waveguide and its method of manufacture.

A further object of the invention is to provide a flanged waveguide and its method of manufacture.

Another object of the invention is to provide a light weight plastic flanged waveguide and its method of manufacture.

Another object of the invention is to provide a flanged waveguide and its method of manufacture wherein a light weight body with flanges are an integral part of the waveguide and wherein a suitable metal is plated on the body portion and flanges with surface continuity.

Other objects of the invention will become readily apparent from the following description and accompanying drawings wherein:

FIG. 1 is an exploded view of an embodiment of the apparatus for carrying out the invention;
FIG. 2 is an assembled view of the FIG. 1 apparatus;
FIG. 3 is a view partially in cross-section showing the masking prior to the plating of the central mandrel and flange elements;
FIG. 4 is a view partially in cross-section showing the FIG. 3 masking removed and the mandrel and flange elements plated;
FIG. 5 is a view partially in cross-section showing the mold prior to the application of the light weight body and flange material on the plated mandrel and flange elements;
FIG. 6 is a perspective view showing the FIG. 5 mold removed and the body and flange material cured onto the plated mandrel and flange elements;
FIG. 7 is an exploded view showing portions of the FIG. 1 apparatus removed;
FIG. 8 is a view partially in cross-section showing a jig for removing the central mandrel; and
FIG. 9 is a perspective view of the end item of the invention.

Referring now to the drawings, an apparatus for carrying out the invention as illustrated in FIGS. 1 and 2 comprises a central mandrel 10 of passivated stainless steel, and flange members 11 and 12, also of passivated stainless steel, aligned with mandrel 10 by dowel pins 13 which extend through apertures 14 in flange members 11 and 12 into bores 15 in mandrel 10 (only two such bores being shown). Mandrel 10 and flange elements 11 and 12 have smooth external surfaces. Flange members 11 and 12 are fixed to mandrel 10 via bolts 16 having reduced diameter threaded end portions 17 which extend through an aperture 18 in each of flange members 11 and 12 and threadedly engage threaded bores 19 in mandrel 10 (only one bore 19 being shown). Bolts 16 are each additionally provided with a thread portion 20 and a flattened end portion 21, the purpose of which will be described hereinafter.

FIGS. 3–8 illustrate the method of manufacture of the light weight plastic flanged waveguide illustrated in FIG. 9, utilizing the apparatus shown in FIGS. 1 and 2.

As illustrated in FIG. 3, masking members 22, of Teflon or other suitable material, are mounted on flange members 11 and 12 and held thereon by washers 23 and nuts 24, nuts 24 being threaded on the threaded portions 20 of bolts 16. Masking members 22 are so constructed as to provide an indent on the inner sides of the flange members indicated at 25, which, for example, are approximately 0.002 inch in depth. With the masking members 22 in place the exposed sides of the passivated stainless steel mandrel 10 and flange members 11 and 12 are copper plated in conventional manner to a depth of approximately 0.002 inch, for example, as illustrated at 26 in FIG. 4, wherein the masking members 22 have been removed. The passivation of mandrel 10 and flange members 11 and 12 ensures poor copper adhesion to the mandrel and flanges while the masking members 22 mask off areas not requiring plating.

The assembly shown in FIG. 4 is then enclosed in a mold of Teflon, for example, as illustrated in FIG. 5, and a suitable compound is injected into the mold. As shown in FIG. 5, the mold includes a central portion 27 configurated so as to abut the edge of the copper plate 26 for support while defining a gap around the surface area of copper plate 26. Central portion 27 is provided with a pour hole or passage 28 through which a suitable material capable of assuming a relatively hard and rigid final form such as a plastic compound is injected into the gap around copper plate 26 by any desirable means, such as by an air gun. Air vents 29 are provided in central mold portion 27 to allow the injection area to escape from the gap so as to allow the gap to be filled with the plastic compound and thus provide a layer of plastic around copper plate 26 as indicated at 30 in FIG. 6. The central portion 27 is retained by side mold portions 31 and 32 which are mounted on bolts 16 and flange members 11 and 12, respectively, by washer 23 and nuts 24 operatively adjusted on the bolts 16. A clamp means indicated at 33 may also be utilized to hold side mold portions 31 and 32 against central portion 27, if desired.

After the plastic layer 30 has been cured, the mold assembly shown in FIG. 5 is removed thus leaving the finished waveguide indicated at 34 mounted on the FIG. 1 apparatus as illustrated in FIG. 6.

As illustrated in FIG. 7, the waveguide 31 has been separated from the FIG. 1 apparatus except for the removal of the central mandrel 10.

FIG. 8 illustrates apparatus for removing central mandrel 10 from the finished waveguide 34 and comprises a jig, indicated generally at 35, of material such as Teflon, clamps indicated at 36 and 37 retain the jig 35 properly attached to waveguide 34. Jig 35 is provided with an aperture or separation indicated at 38 which allows mandrel 10 to pass therein when moved from within waveguide 34 by a press mechanism 39 via a bolt 40 threadedly mounted in bore 19 of mandrel 10.

Upon removal of mandrel 10, the waveguide 34 is removed from jig 35, thus leaving the finished waveguide illustrated in FIG. 9 and having a layer of plastic 30 cured onto the continuous smooth coating or layer of copper 26 which extends across the inner area of the body 41 of the waveguide 34 and to the outer edges of the integral flanges 42.

It has thus been shown that the present invention provides a simple and efficient method of producing a plastic waveguide which has a continuous coating of copper from the inner surface of the plastic waveguide to the outer surfaces of the integral waveguide flanges.

Although a particular embodiment of the final product of the invention, and the apparatus for carrying out the method of the invention, have been illustrated and described, modifications will become apparent to those skilled in the art, and it is intended to cover in the appended claims all such modifications as come within the spirit and scope of the invention.

What we claim is:

1. The method of manufacturing light weight flanged weveguides having surface continuity extending from the outer edge of one flanged side, across the inside of the body, to the outer edge of the other flanged side comprising the steps of: tightly assemblying passivated stainless steel flanges with each end face of a passivated stainless steel mandrel; masking the mandrel and flange assembly by positioning appropriately configured masking members over the flanges so as to expose only the outer surface of the mandrel and the adjoining surfaces of the flanges; plating with conductive material the thus exposed surfaces to a predetermined depth; removing the masking members; surrounding the plated mandrel and flange assembly with a mold assembly constructed so as to provide a space between the inner surface of the mold assembly and the plated area of the mandrel and flange assembly; filling the space with a non-conductive material capable of assuming a relatively hard and rigid final form; curing the non-conductive material; removing the mold assembly from the coated, plated mandrel and flange assembly; and removing the flanges and extracting the mandrel from within the formed assembly.

2. The method of manufacturing light weight flanged waveguides defined in claim 1, wherein the step of surrounding the plated mandrel and flange assembly with a mold assembly is accomplished by positioning a center portion of the mold assembly about the plated surfaces of the mandrel and flange assembly so as to define the space therebetween to be filled with non-conductive material and retaining the center portion of the mold assembly in the desired position by a pair of side portions of the mold assembly.

3. The method of manufacturing light weight plastic flanged waveguides having surface continuity extending from the outer edge of one flanged side, across the inside of the body, to the outer edge of the other flanged side comprising the steps of tightly joining passivated metallic flanges with each end face of a passivated metallic mandrel; masking the thus joined mandrel and flange assembly by positioning appropriately configured removable masking members constructed of suitable material over said metallic flanges so as to expose only the outer surface of the mandrel and the adjoining surfaces of the flanges; copper plating the thus exposed surfaces to a predetermined depth; removing the masking members surrounding the copper plated mandrel and flange assembly with a mold constructed so as to provied a space between the inner surface of the mold and the copper plated area of the mandrel and flange assembly; filling the space with a plastic compound; curing the plastic compound; removing the mold from the plastic coated, copper plated mandrel and flange assembly; removing the flanges from the mandrel; and extracting the mandrel from within the copper plated plastic assembly.

4. The method defined in claim 3, wherein the masking members are constructed of Teflon.

5. The method defined in claim 3, wherein the mold is constructed of Teflon.

6. The method defined in claim 3, wherein the passivated metallic mandrel and flanges are constructed of stainless steel.

References Cited

UNITED STATES PATENTS

| | | | |
|---|---|---|---|
| 2,381,367 | 8/1945 | Quayle | 333—95 |
| 2,518,892 | 8/1950 | Hollingsworth | 333—95 X |
| 2,528,367 | 10/1950 | Iams | 333—95 |
| 2,592,614 | 4/1952 | Stoddard | 333—95 X |
| 2,696,834 | 12/1954 | Carr | 333—95 X |
| 2,716,269 | 8/1955 | Frisbie et al. | 264—135 X |
| 2,826,524 | 3/1958 | Molloy | 333—95 |
| 2,870,524 | 1/1959 | Kinnear | 29—527 X |
| 2,703,989 | 5/1957 | Goodman et al. | 204—9 |
| 2,889,258 | 6/1959 | Fialkoff | 204—9 |
| 3,196,089 | 9/1965 | Stoysos | 204—9 |

FOREIGN PATENTS 696,900   9/1953   Great Britain.

JOHN F. CAMPBELL, Primary Examiner
ROBERT W. CHURCH, Assistant Examiner

U.S. Cl. X.R.
29—527; 204—4, 9; 333—95; 336—192